US008957966B2

(12) United States Patent  (10) Patent No.: US 8,957,966 B2
Loubser et al.  (45) Date of Patent: Feb. 17, 2015

(54) APPARATUS AND METHOD OF CLASSIFYING MOVEMENT OF OBJECTS IN A MONITORING ZONE

(75) Inventors: Gerrit Jacobus Loubser, Pietermaritzburg (ZA); Christopher Langton Hornby, Howick (ZA); Leon De Wit, Pietermaritzburg (ZA); Rory Tait Neilson, Pietermaritzburg (ZA); Pieter Johannes Erasmus Vermeulen, Hillsboro, OR (US)

(73) Assignee: Nortech International (Proprietary) Limited, Pietermaritzburg (ZA)

( * ) Notice: Subject to any disclaimer, the term of this patent is extended or adjusted under 35 U.S.C. 154(b) by 309 days.

(21) Appl. No.: 13/003,080
(22) PCT Filed: Jul. 8, 2009
(86) PCT No.: PCT/IB2009/052969
§ 371 (c)(1),
(2), (4) Date: Feb. 22, 2011
(87) PCT Pub. No.: WO2010/004514
PCT Pub. Date: Jan. 14, 2010

(65) Prior Publication Data
US 2011/0134242 A1  Jun. 9, 2011

(30) Foreign Application Priority Data
Jul. 8, 2008  (ZA) .................................. 2008/05940

(51) Int. Cl.
*H04N 7/18*  (2006.01)
*G06K 9/00*  (2006.01)
(52) U.S. Cl.
CPC ................................. *G06K 9/00771* (2013.01)
USPC ..................................... 348/143; 348/E7.085
(58) Field of Classification Search
CPC ....................................................... G06K 9/00
USPC ......... 348/129, 130, 135, 136, 142, 143, 161,
348/169, 208.14, 225.1, 25, 370, E13.008,
348/E13.022
See application file for complete search history.

(56) References Cited

U.S. PATENT DOCUMENTS 5,519,784 A    5/1996  Vermeulen et al.
6,184,858 B1 *  2/2001  Christian et al. .............. 345/634
(Continued)

FOREIGN PATENT DOCUMENTS

EP    0 700 017    3/1996
GB    2 337 146    11/1999

OTHER PUBLICATIONS

International Search Report for PCT/IB2009/052969, dated Nov. 6, 2009.

*Primary Examiner* — Jay Patel
*Assistant Examiner* — Frank Huang
(74) *Attorney, Agent, or Firm* — Nixon & Vanderhye PC

(57) ABSTRACT

Apparatus for monitoring movement of objects through a monitoring region comprises an overhead camera sensitive to the presence or absence of an object in each of a plurality of adjacent zones in the region individually. The zones are arranged such that there are at least two adjacent rows of zones in a first direction (y) and at least two adjacent rows of zones in a direction (x) perpendicular to the first direction. Each zone is associated with a respective zone index. The camera is operative to capture time sequential images of objects moving through the region comprising sensed data relating to the presence or absence of objects in each of the zones. A processor arrangement is connected to the camera for processing the sensed data into a multidimensional pattern of the presence or absence of the objects in the zones, wherein a first dimension is time and a second dimension is zone index. The processor arrangement is configured to segment the pattern into pattern parts relating to events. A classifier is provided for classifying the pattern parts with reference to historical data relating to anticipated events, to provide a count of objects moving in at least one direction through the region.

9 Claims, 12 Drawing Sheets

(56) References Cited

U.S. PATENT DOCUMENTS 7,920,718 B2 * 4/2011 Marrion et al. ............... 382/103
2006/0227862 A1 10/2006 Campbell et al.
2008/0100438 A1 * 5/2008 Marrion et al. ............... 340/555

* cited by examiner

APPARATUS AND METHOD OF CLASSIFYING MOVEMENT OF OBJECTS IN A MONITORING ZONE

This application is the U.S. national phase, under 35 U.S.C. §371, of International Application No. PCT/IB2009/052969, filed 8 Jul. 2009, which claims priority to South African Application No. 2008/05940, filed 8 Jul. 2008, the entire contents of each of which are hereby incorporated herein by reference.

INTRODUCTION AND BACKGROUND

This invention relates to apparatus and a method of monitoring movement of objects in a monitoring region.

In U.S. Pat. No. 5,519,784 there is disclosed apparatus and a method of classifying movement of objects along a passage. The apparatus comprises means for projecting an array of discrete and spaced parallel linear radiation beams from one side of the passage to an opposite side of the passage. Detectors at the opposite side of the passage sense when the beams are interrupted by one or more persons moving in the passage in either of a first and a second opposite direction. The spaced beams are interrupted at different times in a sequence corresponding to the number of and direction of movement of persons. The sequentially generated interrupted beam signals are stored as object movement historic information in memory and then processed to generate composite beam interrupt patterns manifesting the number of persons and direction of movement, the patterns being a function of time domain and sensor index, i.e. sensor identity and position in the passage. The resulting generated patterns are compared to reference patterns utilizing computerized pattern recognition analysis, such as with an artificial neural network. The comparison classifies the persons in the passage into direction of movement and number.

This apparatus and method may not be suitable for some applications. For example, the means for projecting the spaced parallel beams is mounted in an elongate housing. The housing is normally mounted on one side of the passage to extend parallel to the floor at about between ankle and knee height. This housing may be too large to fit into available space therefor and/or may not be aesthetically acceptable in certain applications. Furthermore, it is labour, time and cost intensive to mount this apparatus on either side of the passage and it often is necessary to chase into the side-walls of the passage to install cabling extending to the apparatus. Still furthermore, the beam projecting means on the one side and the detectors on the other side may become misaligned, which would cause the apparatus to cease functioning. Another problem with this side-on mounted apparatus is that a person or object stationary in the passage could interrupt the beams and hence cause at least temporary insensitivity of the apparatus to other objects moving along the passage on either side of the stationary object. Still a further problem is that the range of the projected beams may not be sufficient to traverse a wide passage. Intermediate structures carrying additional apparatus with all of the aforementioned disadvantages are required to cover the wide passage.

Another known system, but which is fundamentally different, uses tracking algorithms and attempts to identify discrete objects and monitor their position between successive frames produced by an object sensing arrangement, in order to determine a vector for each object of interest. The processing is complex, as it requires a full analysis of each frame and then a comparison to previous frames to determine whether an object is either a previous object in a new position or a new object altogether. Tied in with this, is the difficulty in distinguishing between two people on the one hand and one person carrying a backpack or luggage, for example, on the other. By isolating objects and obtaining their vectors, the system is able to track their movement across a predetermined monitoring region and thus increment or decrement counts accordingly. Any inability of the system to isolate objects, link their successive positions or distinguish number of objects compromises the accuracy of the system. In addition, the visual analysis is extremely processor-intensive and thus expensive.

OBJECT OF THE INVENTION

Accordingly, it is an object of the present invention to provide alternative apparatus and a method of monitoring movement of objects through a monitoring region.

SUMMARY OF THE INVENTION

According to the invention there is provided apparatus for monitoring movement of objects through a monitoring region, the apparatus comprising:
 a sensing arrangement sensitive to the presence or absence of an object in each of a plurality of adjacent zones in the region;
 the zones being arranged such that there are at least two adjacent rows of zones in a first direction and at least two adjacent rows of zones in a direction perpendicular to the first direction;
 each zone being associated with a respective zone index;
 the sensing arrangement being configured to be sensitive to the presence or absence of an object in each of the zones individually and being operative to capture time sequential representations of objects moving through the region comprising sensed data relating to the presence or absence of objects in each of the zones;
 a processor arrangement connected to the sensing arrangement for processing the sensed data into a multidimensional pattern of the presence or absence of the objects in the zones, wherein a first dimension is time and a second dimension is zone index;
 the processor arrangement being configured to segment the pattern into pattern parts relating to events; and
 a classifier for classifying the pattern parts with reference to historical data relating to anticipated events.

The sensing arrangement may comprise at least one camera, which is mounted overhead the monitoring region.

The sensing arrangement may comprise a stereo pair of cameras covering the region from different angles.

Hence, the system according to invention does not attempt to identify each unique object in the field of view but analyses an event and by comparing this to previous knowledge of event features it is able to give a count figure using the classifier, which may comprise a neural network. The image processing is relatively simple and may be done relatively cheaply, while the neural network itself can run on a relatively simple microprocessor, thus saving on cost. It is believed that the system may also alleviate at least some of the aforementioned problems associated with the aforementioned side-on mounted system of U.S. Pat. No. 5,519,784.

The plurality of zones may form an array of immediately adjacent zones and each zone may have a first dimension in the first direction, a second dimension in the second direction and an area.

The sensed data may comprise data or a parameter proportional to a part of the area of the zone being occupied by the object.

The processor arrangement may be configured to segment the pattern along the time dimension, in regions of the pattern of inactivity.

According to another aspect of the invention there is provided a method of monitoring movement of objects through a monitoring region, the method comprising the steps of:
dividing the region into a plurality of zones, each zone being associated with a zone index;
the zones being arranged such that there are at least two adjacent rows of zones in a first direction and at least two adjacent rows of zones in a direction perpendicular to the first direction;
utilizing a sensing arrangement automatically and time sequentially to sense the presence or absence of objects in each of the zones individually;
generating data relating to a multi-dimensional pattern of the presence or absence of the objects in the zones, wherein a first dimension is time and a second dimension is zone index;
segmenting the pattern into pattern parts relating to events; and
classifying the pattern parts with reference to historical data relating to anticipated events.

Yet further included in the scope of the present invention is a computer readable medium hosting a computer program for monitoring movement of objects through a monitoring region, the program executing the steps of:
receiving form a sensor arrangement sensed data relating to time sequential representations of objects moving through the region, the sensed data comprising data relating to the presence or absence of objects in each of a plurality of zones, the zones being arranged such that there are at least two adjacent rows of zones in a first direction and at least two adjacent rows of zones in a direction perpendicular to the first direction and wherein each zone is associated with a zone index;
generating data relating to a multi-dimensional pattern of the presence or absence of the objects in the zones, wherein a first dimension is time and a second dimension is zone index;
segmenting the pattern into pattern parts relating to events; and
classifying the pattern parts with reference to historical data relating to anticipated events,
thereby, in use, to provide as an output, a count of objects moving in at least one direction through the region.

The invention also extends to firmware comprising a computer program and to a computer program configured to perform the aforementioned steps.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
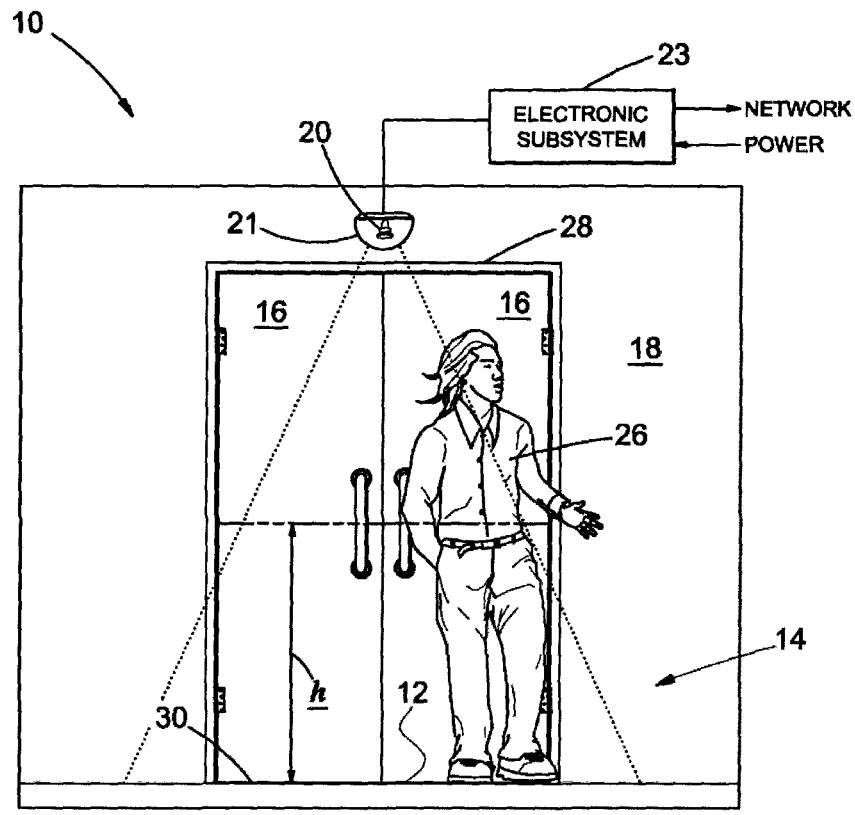
FIG. 1 is a diagrammatic representation of a monitoring region with a camera of apparatus for monitoring movement of objects through the region, mounted above the region.
Figure 2:
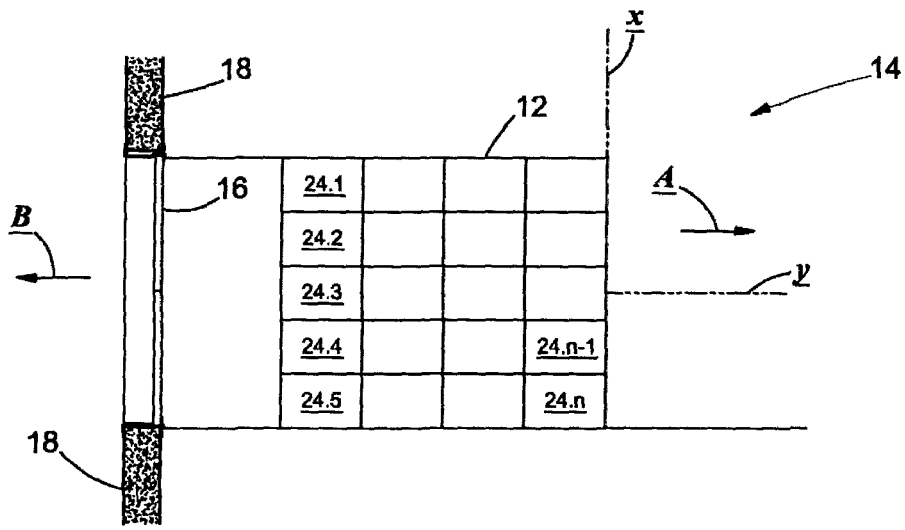
FIG. 2 is a diagrammatic representation of an array of zones in the monitoring region.

Apparatus for monitoring movement of objects through a monitoring region 12 is generally designated by reference numeral 10 in FIGS. 1 and 2.

The region 12 may form part of a portal or passage 14 at a counting point, such as an entrance 16 to a building 18 and the apparatus 10 may be deployed automatically and over a period of time to monitor and count people 26 entering and leaving the building through that entrance, as will hereinafter be described.

Figure 5:
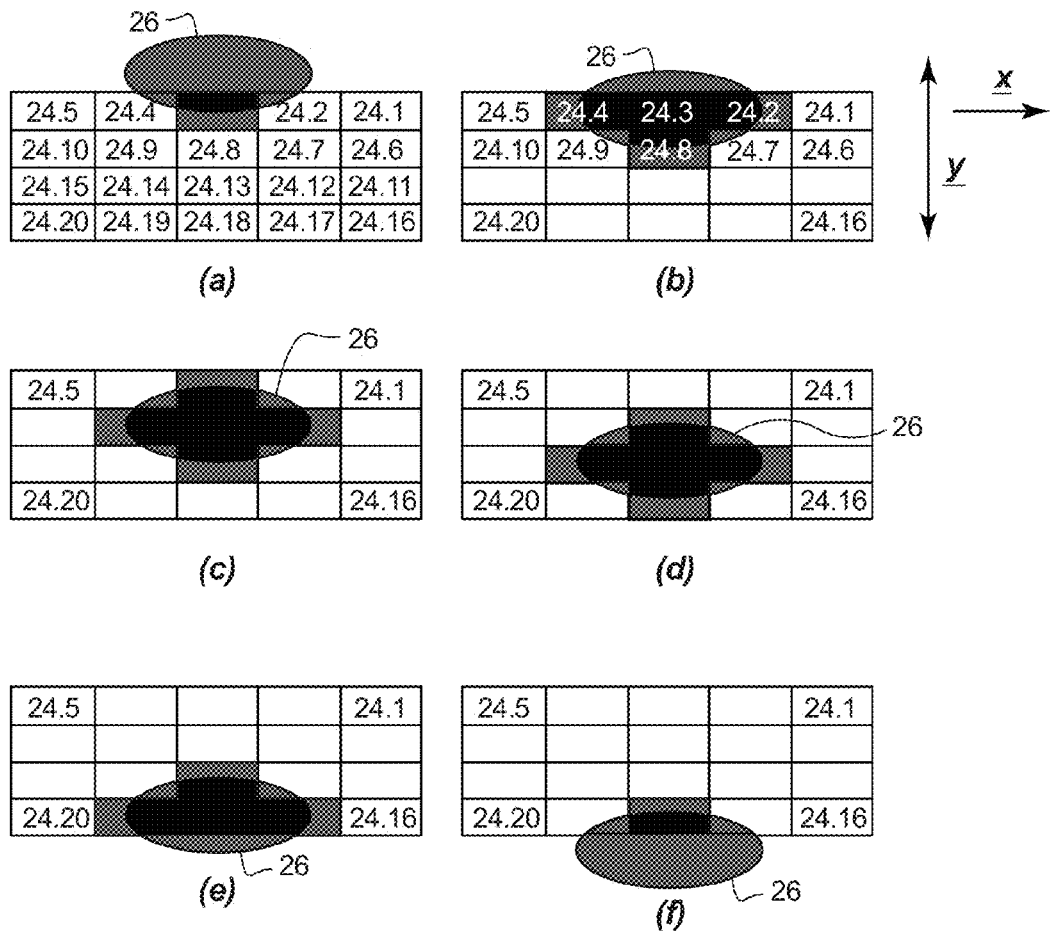
FIG. 5 is a diagram illustrating time sequential images of an elliptical object moving through the region.
Figure 6:
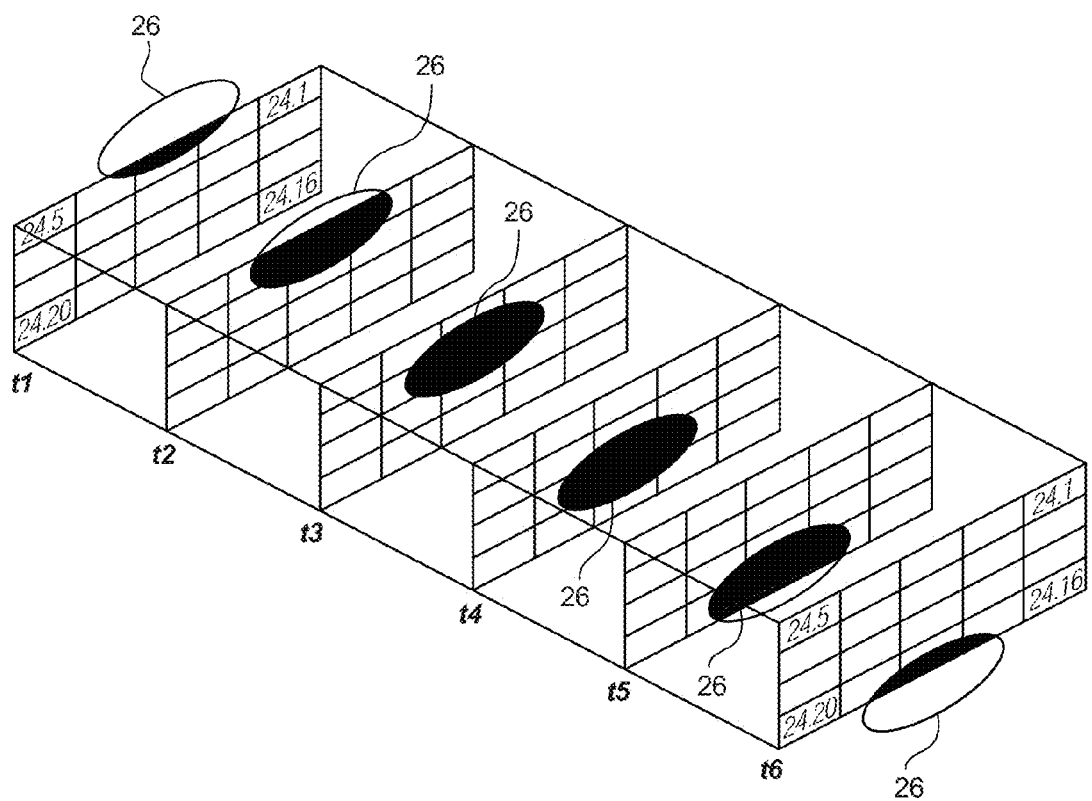
FIG. 6 is a three dimensional representation, one dimension being time, of the object moving through the region.

The apparatus 10 comprises a sensing arrangement 20 sensitive to the presence or absence of an object 26 in each of a plurality of adjacent zones 24.1 to 24.n in the region. Referring to FIG. 2, the zones 24.1 to 24.n are arranged such that there are at least two adjacent rows of zones in a first direction y (that is a general direction of flow of objects through the region) and at least two adjacent rows of zones in a direction x perpendicular to the first direction. Each zone 24.1 to 24.n is associated with a respective zone index. The sensor arrangement 20 is configured to be sensitive to the presence or absence of the object in each of the zones individually and being operative to capture time sequential representations, preferably images (as shown in FIGS. 5 and 6) of an object moving through the region. The images comprise sensed data comprising data relating to the presence or absence of the object in each of the zones. A processor arrangement 22 (shown in FIG. 3) is connected to the sensing arrangement 20 for processing the sensed data into a multidimensional pattern (shown in FIGS. 7 and 8) of the presence or absence of the object in the zones as the object moves through the region, wherein a first dimension is time and a second dimension is zone index. The processor arrangement is further configured to segment the pattern into pattern parts relating to events and a classifier for classifying in real time the pattern parts with reference to historical data relating to anticipated events.

The sensing arrangement may comprise at least one image sensor, such as a video camera 20 and associated optics 21, mounted at the zone 12, for capturing time sequential images of the zone, each image comprising sensed data. The apparatus further comprises an electronic subsystem 23 comprising the processor arrangement 22 (shown in FIG. 3) connected to the camera 20 for receiving the sensed data from the camera and for generating the multi-dimensional pattern data as will hereinafter be described.

The camera 20 is preferably mounted overhead the passage in a roof 28 and hence above the monitoring region 12. The camera may comprise a stereo pair camera comprising first and second cameras directed at the region at different angles so that they cover the region from different angles to add an extra dimension, and to define the monitoring region 12 at a suitable level or height h above a floor 30 of the passage 14. The subsystem 23 may be provided at the monitoring zone, alternatively centrally at the same building to be connected to similar sensing arrangement at other entrances (not shown) of the building, further alternatively the subsystem may be positioned remotely and off-site.

In an example embodiment shown in FIG. 2, the monitoring region 12 comprises a first axis y extending in a first direction and a second axis x extending in a second direction, which is perpendicular to the first direction, so that each zone has an area. The aforementioned plurality of zones 24.1 to 24.n in the monitoring zone 12 form an array of rows and columns of adjacent regions, each having a first dimension in the first direction and a second dimension in the second direction.

Figure 3:
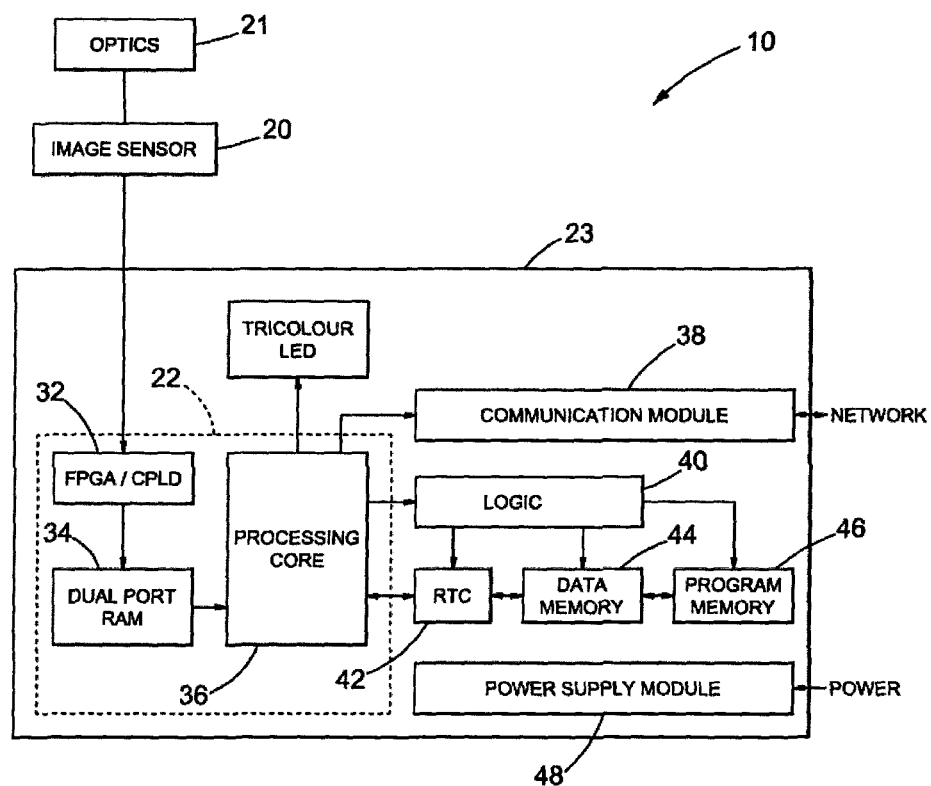
FIG. 3 is a block diagram of the apparatus.

In an example embodiment shown in FIG. 3, the camera 20 is connected to the processor arrangement 22 of the subsystem 23. The processor arrangement comprises a field programmable gate array (FPGA), alternatively a complex programmable logic device (CPLD) 32. The FPGA is connected to a dual port RAM arrangement 34 and the arrangement 34 is connected to a processing core 36. In other embodiments (not shown) the processor arrangement 22 may comprise a camera interface and a processor with Direct Memory Access (DMA). The subsystem 23 further comprises a communications module 38 connected to the processing core 36 and to logic circuitry 40. Also connected to the logic circuitry are a real time clock (RTC) 42, data memory arrangement 44 and program memory arrangement 46. The apparatus 10 is provided with electrical power, by power supply module 48, which is connectable to mains power. The communications module 38 enables data communications between the apparatus 10 and an external network.

As stated hereinbefore, the camera 20 is configured to capture time sequential images of the region 12. Hence, each image and its associated sensed data are associated with unique time related data, thereby providing a time dimension for the sensed data and a multi-dimensional representation, as will hereinafter be described.

Referring to FIG. 5, time sequential images generated by the sensing arrangement 20 when an elliptical object 26 moves through the region 12 are illustrated in FIGS. 5(a) to 5(f). For example, at the time of the second image, that is the image in FIG. 5(b), the object covers zone 24.3 completely and zones 24.2, 24.4 and 24.8 partially. The sensed data may, as a parameter, include data proportional to a part of the area of the zone being occupied or covered by the object.

The stream of sensed data or matrixes in FIGS. 5(a) to 5(f) may be represented in a three-dimensional representation, wherein time is one dimension and as illustrated in FIG. 6.

Figure 7:
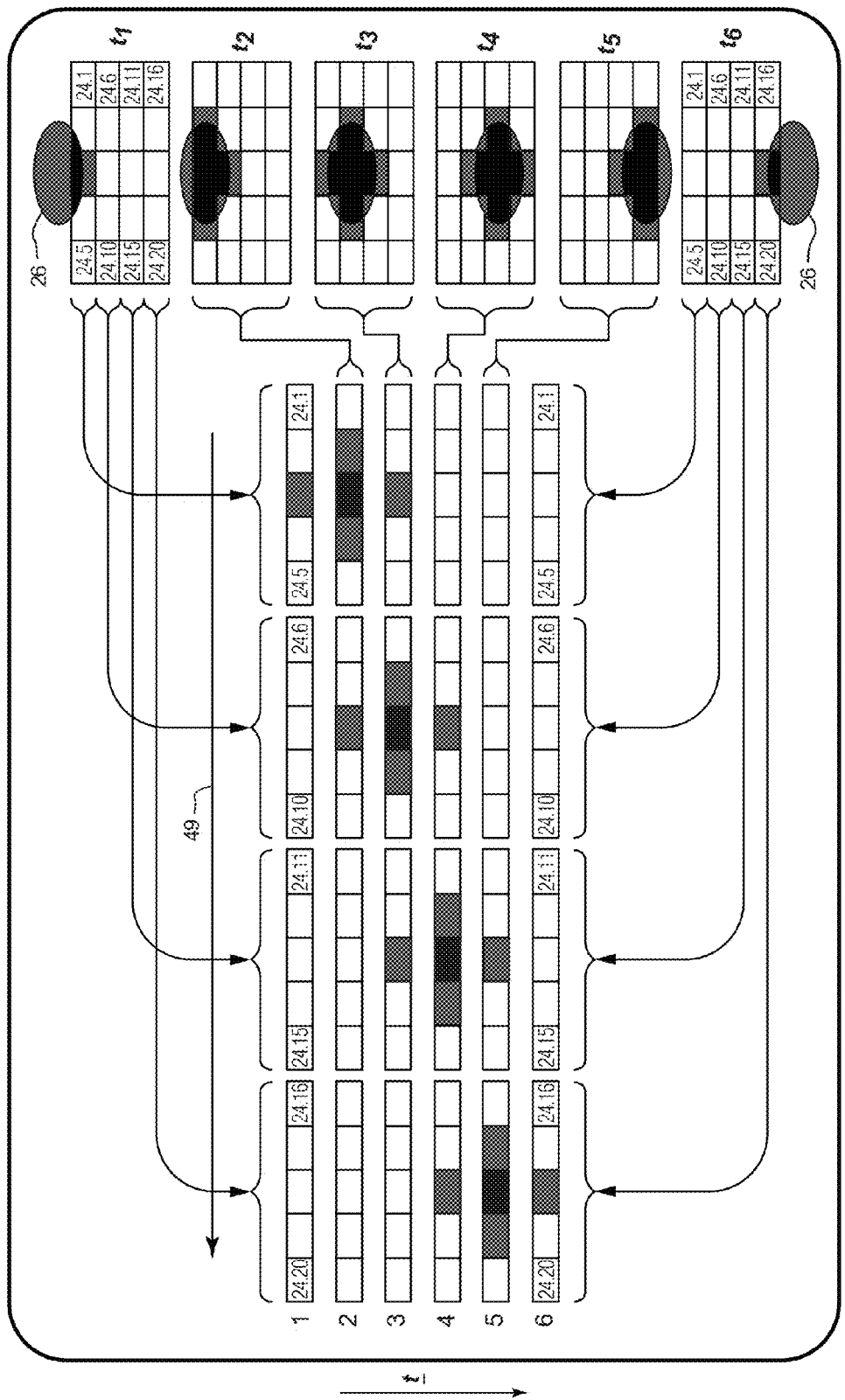
FIG. 7 is an alternative representation wherein the three dimensional tensor has been flattened into a two-dimensional matrix.

The three-dimensional representation may be rearranged by vectorizing the matrixes and so flatten the three-dimensional tensor into a two-dimensional representation of which one axis is time (t) and another is illustrated at 49 in FIG. 7.

The stream of pattern matrixes is segmented in time, corresponding to periods of activity. An event is triggered whenever the sum of pattern matrix elements exceeds a threshold level over a small set of consecutive frames. Conversely an event is terminated whenever the sum falls below the threshold over a set of consecutive frames.

Figure 8:
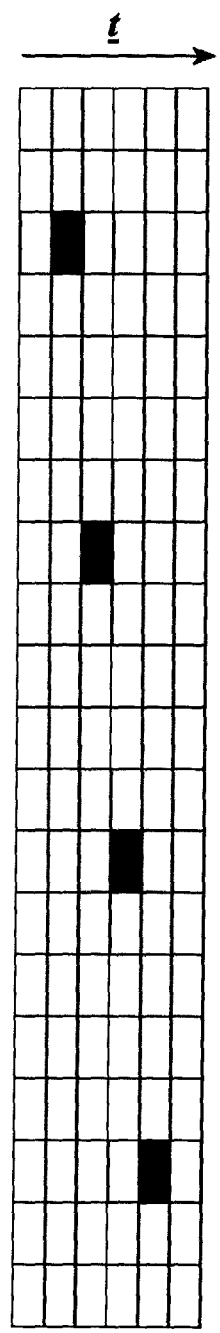
FIG. 8 is a resulting representation of the event of FIG. 5.
Figure 9:
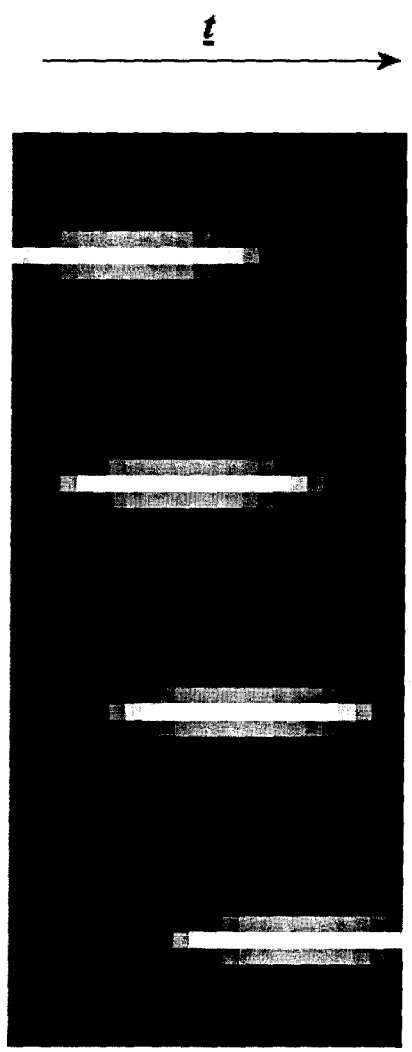
FIG. 9 is an image of the event in FIGS. 5 and 9.

Representations of the event in FIG. 5 are shown in FIGS. 8 and 9.

Figure 10:
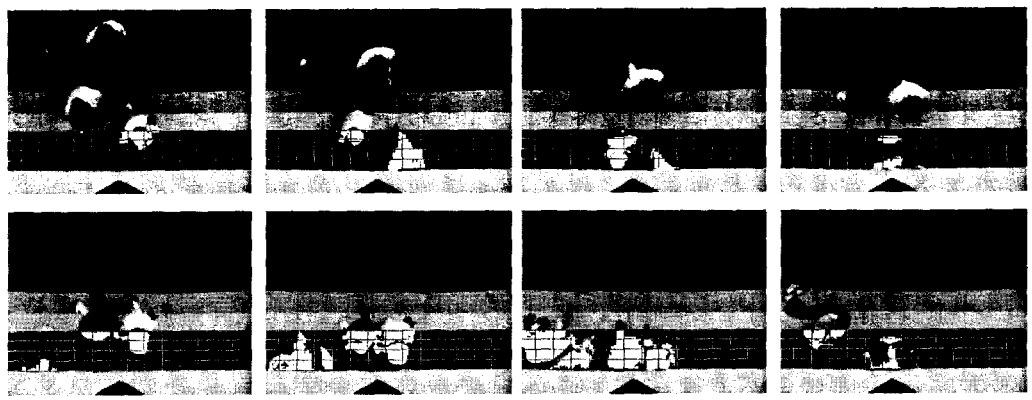
FIG. 10 is a photograph from above of a plurality of people moving through the region.
Figure 11:
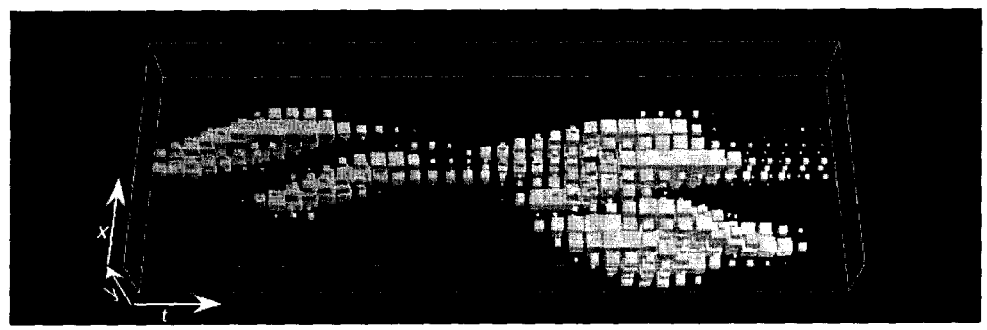
FIG. 11 is a representation similar to FIG. 6 of the event in FIG. 10.
Figure 12:
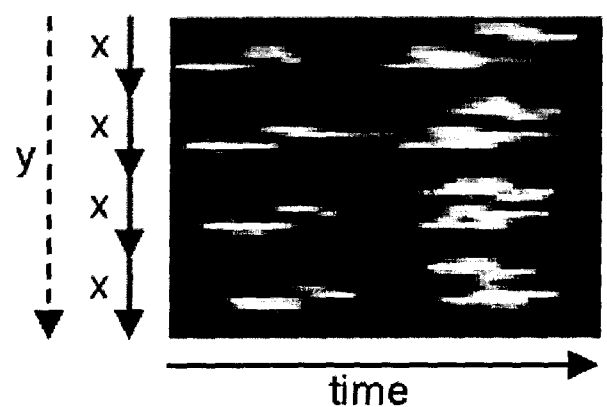
FIG. 12 is an image similar to FIG. 9 of the event in FIG. 10.

In FIG. 10 there is shown another example event wherein a plurality of people are moving in either direction through the region 12. FIG. 11 corresponds to FIG. 6 for the latter event and FIG. 12 corresponds to FIG. 9 for this latter event.

Figure 4:
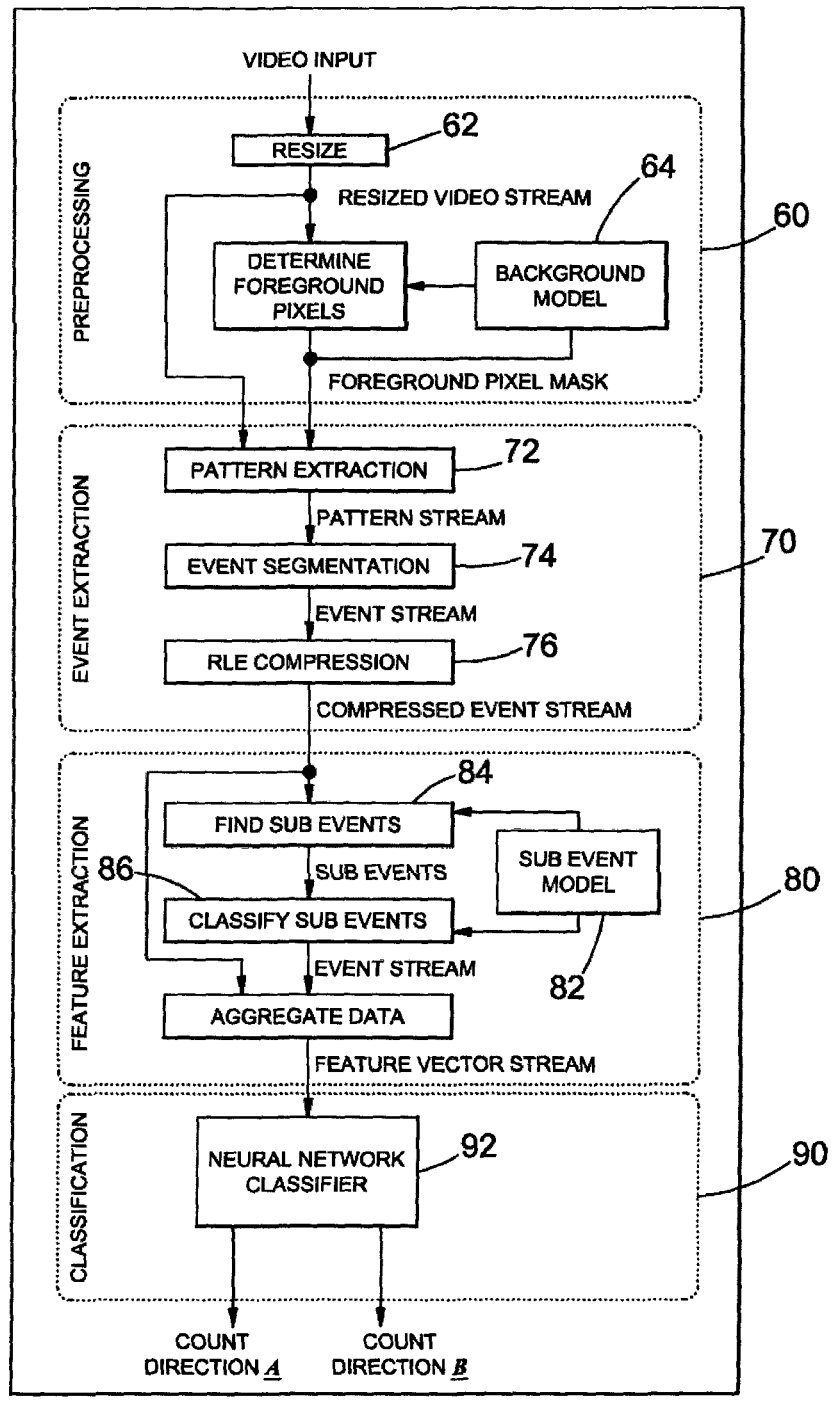
FIG. 4 is a flow diagram of relevant parts of a method of monitoring movement of objects through a monitoring region.

Referring now to FIG. 4, the apparatus and method have the following main components, preprocessing 60, event extraction 70, feature extraction 80 and classification 90 to transform and process a mass of pixel related data in a video volume down to two numbers, namely count in direction A and count in direction B.

The front end video pre-processing 60 is concerned with processing the raw pixel stream into a form that is distinctive yet invariant with respect to the background as well as global variation in brightness and contrast. This part of the system may be the most computationally sensitive as it operates on a per pixel level. Thus, video processing is intentionally kept relatively simple. At 62, the image is first reduced to a manageable size by filtering and down sampling. From this resized image an active region is extracted. The active region is a user specified area in a frame that defines the boundary across which people are counted. For computational efficiency this boundary is required to be straight and image axis aligned. This boundary defines two directions, the first direction of flow y and the second direction x perpendicular thereto. The active region is an axis aligned rectangle that is centred on the boundary. The rectangle's lateral width is specified by the user and its dimension along the direction of flow is determined by the relative scale of an average human in the frame.

Only the active region is processed further and the rest of the frame is discarded. An important task of the pre-processing is to normalise the raw input video with respect to the background. The background in this context shall be defined as the part of the image that corresponds to objects in the scene that are physically static over an extended period of time. The foreground, conversely, corresponds to the parts of the image that depict physically moving objects. To segment each frame as such, models of the pixel variation associated with both the foreground and background are constructed. Since the background is defined by its slow rate of change a background model 64 is approximated by essentially applying a temporal low-pass filter to statistics associated with the input video. A foreground model is constructed by analysing the statistics of image regions not sufficiently described by the background model. This normalisation process is referred to as background removal. It ultimately attempts to assign, to each pixel of an input frame, a probability that it is part of the foreground (a moving object).

For computational simplicity each input pixel is considered independently, each pixel in turn has a set of channels associated with it. The variation within these channels is modelled by a multivariate Gaussian distribution. This choice is weakly motivated by the ubiquity of the Gaussian distribution due to the Central Limit Theorem, but more so by the fact that the Gaussian distribution can be fitted to input data simply by calculating its average and spread. The multivariate Gaussian distribution of a d-dimensional random variable x with mean $\mu$ and covariance $\Sigma$ is as follows:

$$G_{\mu,\Sigma}(x) = \frac{1}{\sqrt{(2\pi)^d |\Sigma|}} \exp\left[-\frac{1}{2}(x-\mu)^T \Sigma^{-1}(x-\mu)\right]$$

Often the logarithm of this distribution is more convenient for computation:

$$\ln(G_{\mu,\Sigma}(\Delta)) = -\frac{1}{2}\left[d\ln(2\pi) + \ln|\Sigma| + \Delta^T \Sigma^{-1} \Delta\right]$$

Where $\Delta \equiv x - \mu$

Each pixel is represented by a d dimensional vector x of pixel channels. Currently four channels are used, the luminance and two chrominance values from the YUV colour space as well as the time derivative of the luminance. Pixel foreground and background conditional distributions as follows:

$$P(x|x \in S_{bg}) = G_{\mu_{bg}, \Sigma_{bg}}(x), P(x|x \in S_{fg}) = G_{\mu_{fg}, \Sigma_{fg}}(x)$$

Where $S_{fg}$ and $S_{bg} = S_{fg}^C$ represent the sets of the possible x that corresponds to the foreground and background respectively and $\{\mu_{bg}, \Sigma_{bg}\}$ and $\{\mu_{fg}, \Sigma_{fg}\}$ correspond to the mean and covariance associated with the foreground and background respectively. To keep this derivation concise the fg and bg subscripts that denote the two distributions shall be omitted in equations that hold for both the foreground and background models.

For the sake of computational simplicity the pixel channels are assumed independent. Thus $\Sigma$ is assumed diagonal and so the Gaussian distributions may be expressed as follows $$\ln[G_{\mu,\Sigma}(x)] = -\frac{1}{2}\left[d\ln(2\pi) + \sum_{i=1}^{d}\left(\frac{(x_i - \mu_i)^2}{\sigma_i^2} + \ln(\sigma_i^2)\right)\right]$$

Where $\sigma_i^2$ correspond to the diagonal elements of $\Sigma$ and $x_i$ and $\mu_i$ are the elements of a x and $\mu$ respectively for i=1 . . . d. Given the prior probabilities for the two classes, $P(x \in S_{fg}) \equiv \gamma_{fg}$, $P(x \in S_{bg}) \equiv \gamma_{bg}$ the conditional distributions can be transformed into joint distributions:

$$P(x, x \in S) = P(x \in S)P(x|x \in S) \equiv p(x)$$

Note the priors are constrained by $\gamma_{fg} + \gamma_{bg} = 1$, since a pixel belongs to either the foreground or background.

The ultimate goal is the posterior probability $P(x \in S_{fg}|x) \equiv z_{fg}(x)$, the probability that a given pixel is part of the foreground. This may be calculated according to Bayes' theorem as follows:

$$z_{fg}(x) = \frac{p_{fg}(x)}{p_{bg}(x) + p_{fg}(x)} = 1 - z_{bg}(x)$$

In terms of the logarithmic forms of the distributions, which better represents the actual method of calculation, may be expressed as follows:

$$L(x) \equiv \ln p(x) = \ln \gamma - \frac{1}{2}\left[d\ln(2\pi) + \sum_{i=1}^{d}\left(\frac{(x_i - \mu_i)^2}{\sigma_i^2} + \ln(\sigma_i^2)\right)\right]$$

-continued $$z_{fg}(x) = \left(1 + \frac{p_{fg}(x)}{p_{bg}(x)}\right)^{-1} = \frac{1}{1 + \exp(L_{fg}(x) - L_{bg}(x))}$$

The parameters of these distributions, $\{\mu_{bg}, \Sigma_{bg}\}$ and $\{\mu_{fg}, \Sigma_{fg}\}$ are adapted over time to track changing illumination and changes in the background. The background mean $\mu_{bg}$ is modelled per pixel however the variances $\Sigma_{fg}$, $\Sigma_{bg}$ and the foreground mean $\mu_{bg}$ are global and shared by all pixels in the image. This choice was made to keep the computational complexity down but also to keep the calculation of the variances more stable by averaging the statistic over the entire frame.

Figure 13:
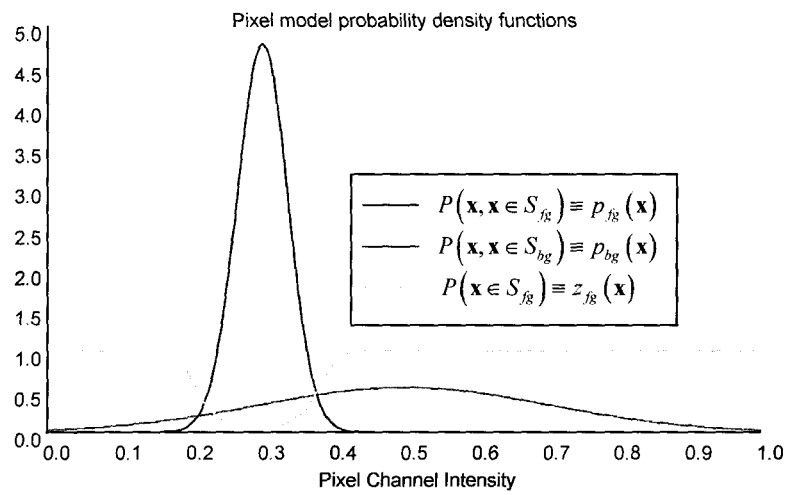
FIG. 13 is a graph of distributions associated with a pixel channel.

FIG. 13 is a typical example of the distributions associated with a pixel channel. The posterior probability is close to 1 where the foreground is dominant, but decreases to almost 0 where the background is dominant. The pixel model parameters are gradually updated after each frame so as to track slow changes in statistics caused by variation in global illumination or additions to the background. The model parameters are updated in a manner similar to a first order low-pass IIR filter. Given the current parameters $\theta_i$ the new parameters $\theta_{i+1}$ are defined as follows:

$$\theta_{i+1} = \frac{\theta_i + \lambda \hat{\theta}}{1 + \lambda}$$

where $\lambda$ is the adaptation rate and $\hat{\theta}$ is the vector of parameters obtained by fitting the model to the data in the current frame. The foreground a background means and variances are approximated as weighted first and second moments of the pixel channel values. The pixel weightings are dependent on their associated probabilities. The foreground probability is used in the calculation of the foreground model parameters and the background probability for the background parameters. A much slower adaptation rate is used for the variance calculation since it requires more degrees of freedom, thus more data is needed to reliably determine it. A non-linearity is added to this linear approach by making $\lambda$ dependent on the foreground and background pixel probabilities. This is done with the variance update by modulating $\lambda$ by the fraction of foreground pixels in the current frame. Thus variances only change when there is activity within the frame. This prevents the variances from becoming artificially small over long periods of no activity. This also makes sense in that one is only interested in distinguishing foreground and background at times of activity within the frame.

Once the input video is normalised into a form that is independent of the background and illumination, the video it is broken down into manageable chunks. This is done by down sampling the normalised video into patterns and then segmenting these patterns in time to form events.

Patterns are extracted at 72 for each frame directly from its foreground probability image. The pattern is simply constructed by averaging the foreground probability within the zones 24.1 to 24.n of the grid or array spanning the region. As shown in FIGS. 2 and 5, the grid has four divisions in the direction of flow. The number of divisions in the lateral direction is dependent on the physical width of the active region. The zones' aspect ratio is kept constant, however, their scale is matched to the average relative size of a human in the frame. Thus, each frame yields a pattern that may be represented by a matrix whose elements correspond to the fraction of foreground pixels in their associated zone.

The pattern matrices are stacked over time into what may be thought of as a three-dimensional tensor and as shown in FIGS. 6 and 11. At 74 in FIG. 4, this stream of pattern matrices is segmented in time into events, corresponding to periods of activity. An event is triggered whenever the sum of pattern matrix elements exceeds a threshold over a small set of consecutive frames. Conversely an event is terminated when the sum falls below the threshold over a set of consecutive frames. The representation in FIG. 11 depicts each zone as a cube with a size proportional to the zone's value. To compactly visualise theses events it is useful to flatten the three dimensional structure along the direction of flow to form a matrix, as illustrated in FIG. 7 which may be conveniently depicted as a two-dimensional image, as is the case FIGS. 8, 9 and 12. Referring again to FIG. 4, in an attempt to compact event patterns in time and to some extent normalise the event with respect to object velocity, an approach analogous to Run Length Encoding (RLE) is applied at 76 to the events. The process begins with the first frame pattern as a prototype. Frames are then compared in succession with the prototype, if the frame is not represented well by the prototype (i.e. the difference is large) it then becomes the new prototype. This process continues until the end of the event is reached. The normalised event is constructed by averaging the stretches between prototype changes into single patterns. The length of each span is also recorded an appended onto each prototype vector so original timing is not lost.

A normalised mean square distance measure is used to compare patterns $$D(p_0, p_1) = \frac{|p_1 - p_0|^2}{|p_1|^2 + |p_0|^2 + c}$$

Where p. are column vectors representing patterns and c is a small positive regularising constant to prevent division by zero. For clarity, any events mentioned in the remainder of this description shall be assumed normalised in this respect.

Feature extraction at 80 in FIG. 4 generally involves projecting from some usually high dimensional input space associated with an input sensor arrangement 20 to a low dimensional parameter space associated with a model of the objects of interest. In this case, feature extraction is concerned with projecting a variable length event pattern into a distinctive fixed length feature vector.

Events are further decomposed into regions that correspond to common lower level sub-events such as single people, 2 people close together or a person with a trolley. To do this, a model 82 of such sub-events is constructed. Linear models provide the simplest option for this as there exists closed form solutions to their construction, such as Principle Component Analysis (PCA) and Linear Discriminant Analysis (LDA). While these methods produce models that compactly and distinctly represent the sub-events, they do not provide a direct method of classifying them. For this, a Gaussian Mixture Model (GMM) is used to partition the subspace produced by PCA and LDA into classes. The sub-event model consists of two related models, a simple search model used to efficiently find (at 84 in FIG. 84) sub-events within an event; and a more complex classification model used to provisionally or weakly classify them at 86. Both of these models consist of linear basis constructed using LDA and a GMM defined in the sub space spanned by the basis. Sub-events span a fixed size window within the larger event. In this case a 6×4×16 window is used. If the window extends beyond the dimensions of the event, zeros are substituted for the out of bounds elements. Augmented to the sub-event data extracted from within the window, is the relative lateral location of the window as well as the set of spans generated by the RLE compression that correspond to the window frames.

As stated hereinbefore, a simple sub-event model is used to efficiently find at 84 valid sub-events within an event. This simple model attempts to distinguish between three classes:

Inward—sub-events that are on average in the inward direction as illustrated at A in FIG. 2;
Outward—sub events that are on average in the outward direction as illustrated at B in FIG. 2; and
Null—Regions of the event that do not correspond to moving people.

The exemplars for each of the classes when projected back into the event space are shown in the following table:

TABLE 1

Simple sub-event classes

| ID | 1 | 2 | 3 |
|---|---|---|---|
| Type | null | in | out |
| Exemplar | | ▪▪▪ | |

Figure 14:
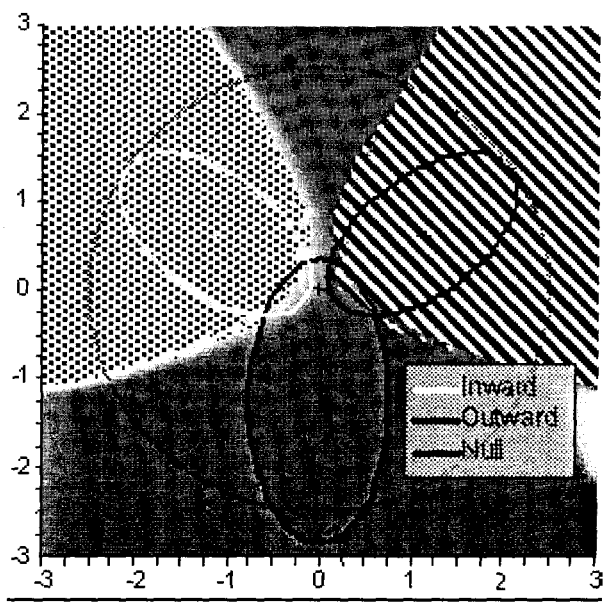
FIG. 14 is a representation of a simple sub event model.

In FIG. 14 there is depicted the GMM used to distinguish these classes within the LDM sub space. In the plot, the lines correspond to the iso-probability lines of the individual Gaussian components. Note the Gaussian components have unrestricted covariance matrices, thus the iso-probability lines map to ellipsoids. The background image in the plot depicts the soft decision boundaries generated by the posterior probability of the classes.

Figure 15:
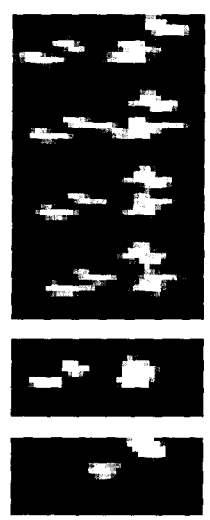
FIG. 15 depicts sub-event search images.
Figure 16:
FIG. 16 is a representation of maxima defining centres of sub-events.

Sub-events are found at 84 by exhaustively searching the event in time and along the direction lateral movement. A three-dimensional window, the size of the sub-event model, is slid over the event, classifying each point as either the centre of an inward, outward or null sub-events. This produces a pair of two-dimensional search images as shown in FIG. 15, corresponding to the inward and outward directions. These images are added together and smoothed to produce an image with well defined maxima as shown in FIG. 16. It is these maxima that define the centres of the sub-events. The maxima in FIG. 16 are indicated by black pixels 100 in the blob centres. The inward and outward images are used again later in the in the feature calculation.

Once sub-event centres are found as aforesaid, they need to be weakly classified at 86 in FIG. 4. This is done with a more elaborate classifying sub-event model. It is more computationally expensive and more discriminating, but is only applied to already found sub-events and not the entire event. This model uses a five-dimensional basis.

Twelve sub-event classes are distinguished by this model. These classes are summarised in the following table:

TABLE 2

Sub event classes

| ID | | 1 | 2 | 3 | 4 | 5 | 6 | 7 | 8 | 9 | 10 | 11 | 12 |
|---|---|---|---|---|---|---|---|---|---|---|---|---|---|
| People | in | 0 | 1 | 0 | 1 | 0 | 1 | 2 | 0 | 3 | 0 | 2 | 1 |
| | out | 0 | 0 | 1 | 0 | 1 | 1 | 0 | 2 | 0 | 3 | 1 | 2 |
| Trolley | in | 0 | 0 | 0 | 1 | 0 | 0 | 0 | 0 | 0 | 0 | 0 | 0 |
| | out | 0 | 0 | 0 | 0 | 1 | 0 | 0 | 0 | 0 | 0 | 0 | 0 |
| Exemplar | | ▪▪▪▪▪▪ | | | | | | | ▪▪▪▪▪▪ | | | | |

Figure 17:
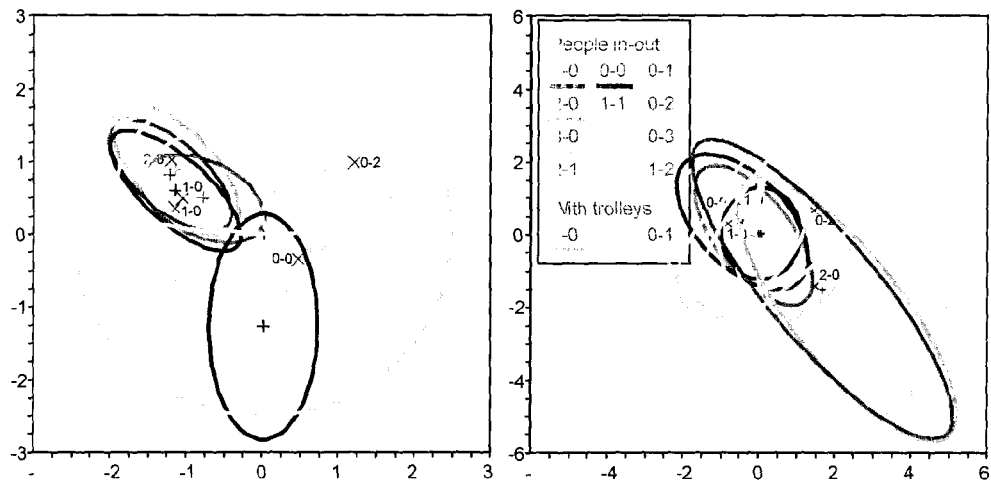
FIG. 17 is a representation of the first four dimensions of a sub-event model.

Like the simple model each class is modelled as a Gaussian component with unrestricted covariance. FIG. 17 shows the first four dimensions of the sub-event model.

Figure 18:
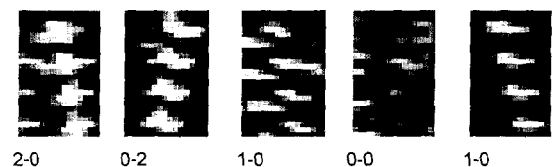
FIG. 18 is a representation of sub-events extracted from the event in FIG. 15 and their classifications.

The x's in FIG. 17 plot the sub-events found in the example event in FIG. 15 with each square labelled according to a rounded version of the sub-event model's classification of it. The corresponding appearance of these sub events in the event space and their classification is shown in FIG. 18.

Figure 19:
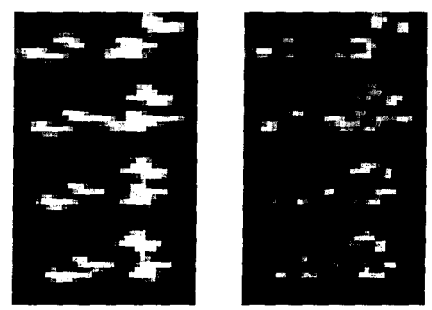
FIG. 19 is a representation of the original event in FIG. 15 and a residual event after the sub-events in FIG. 18 have been removed.

The classification sub-event model seems to have done quite well in this particular case as the actual count for the entire event is 4-2. Each sub-event is classified in turn each producing a vector of posterior probabilities where the $i^{th}$ element corresponds to the probability that the sub-event represents the $i^{th}$ class. These vectors are summed over all the sub-events to produce a vector z that forms part of the final feature vector. The components of z roughly correspond to the number of sub-events of each class within the event. If two sub-events are found close together with an appreciable overlap in their associated windows, the possibility arise that the overlapping information is counted twice, once for each sub-event. To mitigate this after each sub-event is classified, the result of the classification is projected back into the event space and subtracted from the original event effectively marking that part of the event as counted. FIG. 19 shows the original event and what remains after the sub-events have been successively removed.

The construction of the sub-event model requires that the locations and labels of the sub-events within the training data are known. However, this data is not available, since the training data is not segmented down to sub-event level, there is but a single label per event. Thus, an iterative approach is used to build the sub-event model. The process begins with an initial model constructed under the assumption of a single sub-event per event, centred at the event's centroid. Using this rough model a new set of sub-events are found and classified from which the model may be recalculated and so the process continues until the model converges.

The feature vector f consists of a set of aggregate statistics over the entire event. The structure of the feature vector is as follows $$f = [t_e\, t_c\, m_{in}^T\, m_{out}^T\, s\, z^T]^T$$

Where:

$t_e$ Duration of the event in frames
$t_c$ Length of the compressed event
$m_{in}$ Moments of the inward search image
$m_{out}$ Moments of the outward search image
s The sum of the maxima values corresponding to sub events centres
z The total sub event classification vector The moment vectors $m_{in}$ and $m_{out}$ consist of the $0^{th}$ and $2^{nd}$ degree moments of the in and out search images illustrated in FIG. 15. Each moment vector has 4 dimensions of the following form $$m = [m_{0,0}\, m_{2,0}\, m_{0,2}\, m_{1,1}]^T$$

Where if $f_{x,t}$ represents an image element at lateral position x and time t $$m_{0,0} = \sum_x \sum_t f_{x,t}$$

$$\begin{bmatrix} m_{1,0} \\ m_{0,1} \end{bmatrix} = \frac{1}{m_{0,0}} \sum_x \sum_t f_{x,t} \begin{bmatrix} x \\ t \end{bmatrix}$$

$$\begin{bmatrix} m_{2,0} & m_{1,1} \\ m_{1,1} & m_{0,2} \end{bmatrix} = \frac{1}{m_{0,0}} \sum_x \sum_t f_{x,t} \begin{bmatrix} x \\ t \end{bmatrix} [x\ t] - \begin{bmatrix} m_{1,0} \\ m_{0,1} \end{bmatrix} [m_{1,0}\ m_{0,1}]$$

The sub-event classification vector is twelve-dimensional, as there are twelve sub-event classes, the moment vectors contribute four components each and there are the three scalars, thus the final feature vector is twenty-three dimensional.

Referring again to FIG. 4, the goal of the classification at 90 is to extract the final "in" and "out"-counts from each feature vector. A mapping between feature vectors and counts needs to be constructed, which constitutes a regression problem. An artificial neural network 92 is used to implement this mapping. The neural network learns this mapping from a large set of tagged events by optimising the regression error. A Standard Multi-layer Perception (MLP) is used, with a single hidden layer using sigmoid activation functions and output layer with linear activation for regression.

The training of the MLP is essentially an optimisation problem, minimising the output error with respect to the edge weights, for this a conjugate gradient descent algorithm is used. The training data takes the form of a set of feature vectors and corresponding count labels. However, before training, the features are whitened, normalising the feature space to unit covariance, so improving the chance of convergence to an absolute minima. The normalizing projections are incorporated back into the first layer weights of the neural network after it is trained.

It will be appreciated that the output of the neural net could be used to count people moving through the region and any one of the direction A and direction B shown in FIG. 2.

The invention claimed is:

1. An apparatus for monitoring over time movement of objects through a monitoring region by recording patterns caused by the movement of the objects, utilizing the patterns to generate a plurality of time sequential events relating to the movement, with each event comprising respective event data and thereafter classifying the event data into a class of a plurality of classes comprising at least a first class of one object moving in a first direction, the apparatus comprising:
 a sensing arrangement sensitive to the presence or absence of an object in each of a plurality of adjacent zones in the region individually;
 the plurality of adjacent zones being arranged in the region in two dimensions such that there are at least two adjacent rows of zones extending along a first axis of the monitoring region in the first direction and at least two adjacent rows of zones extending along a second axis of the monitoring region;
 the sensing arrangement being operative to capture consecutive time sequential image frames of at least one object as it moves through the monitoring region;
 the consecutive time sequential image frames comprising respective two dimensional pattern matrixes, wherein each pattern matrix comprises a plurality of pattern matrix elements, wherein each pattern matrix element corresponds to a respective one of said zones in the monitoring region and wherein each pattern matrix element of each pattern matrix comprises sensed data relating to the presence or absence at the time of the respective image frame of the at least one object in the corresponding zone;

a processor arrangement connected to the sensing arrangement and for recording said two dimensional pattern matrixes of said consecutive time sequential image frames and for processing the recorded two dimensional pattern matrixes into a multidimensional pattern representing the presence or absence of said at least one object in the zones as it moves through the monitoring region, wherein a first axis of the multidimensional pattern is time and wherein all the pattern matrix elements of each two dimensional pattern matrix of each of said consecutive time sequential image frames are rearranged in a respective single row along a second axis of the multidimensional pattern and in time sequential relationship against the time axis, so that the multidimensional pattern comprises a plurality of time sequential events comprising respective event data and wherein an event commences when the sum of the sensed data of the pattern matrix elements over a predetermined number of said consecutive time sequential image frames exceeds a threshold value and terminates when the sum of the sensed data of the pattern matrix elements over a predetermined number of said consecutive time sequential frames falls below the threshold value;

the processor arrangement being configured to segment the multidimensional pattern along the time axis to separate the time sequential events from one another; and a classifier for thereafter classifying the event data of each separated event into one of said plurality of classes with reference to historical reference data relating to anticipated events.

2. The apparatus as claimed in claim 1, wherein the sensing arrangement comprises a stereo pair of cameras covering the region from different angles.

3. The apparatus as claimed in claim 1, wherein the plurality of zones form an array of immediately adjacent zones and wherein each zone has a first dimension along the first axis, a second dimension along the second axis and an area.

4. The apparatus as claimed in claim 3, wherein the sensed data comprises a parameter proportional to a part of the area of the zone being occupied by the object.

5. The apparatus as claimed in claim 1, wherein the sensing arrangement comprises at least one camera, which is mounted overhead the monitoring region.

6. A method for monitoring over time movement of objects through a monitoring region by recording patterns caused by the movement of the objects, utilizing the patterns to generate a plurality of time sequential events relating to the movement, with each event comprising respective event data and thereafter classifying the event data into a class of a plurality of classes comprising at least a first class of one object moving in a first direction, the method comprising the steps of:

dividing the monitoring region into a plurality of adjacent zones, the plurality of zones being arranged in the monitoring region in two dimensions such that there are at least two adjacent rows of zones extending along a first axis of the monitoring region in the first direction and at least two adjacent rows of zones extending along a second axis of the monitoring region;

utilizing a sensing arrangement to capture consecutive time sequential image frames of at least one object as it moves through the monitoring region, the consecutive time sequential image frames comprising respective two dimensional pattern matrixes, wherein each pattern matrix comprises a plurality of pattern matrix elements, wherein each pattern matrix element corresponds to a respective one of said zones in the monitoring region and wherein each pattern matrix element of each pattern matrix comprises sensed data relating to the presence or absence at the time of the respective image frame of the at least one object in the corresponding zone;

recording said two dimensional pattern matrixes of said consecutive time sequential image frames and processing the recorded two dimensional pattern matrixes into a multidimensional pattern representing the presence or absence of said at least one object in the zones as it moves through the monitoring region, wherein a first axis of the multidimensional pattern is time and wherein all the pattern matrix elements of each two dimensional pattern matrix of each of said consecutive time sequential image frames are rearranged in a respective single row along a second axis of the multi-dimensional pattern and in time sequential relationship against the time axis so that the multidimensional pattern comprises a plurality of time sequential events comprising respective event data and wherein an event commences when the sum of the sensed data of the pattern matrix elements over a predetermined number of said consecutive time sequential image frames exceeds a threshold value and terminates when the sum of the sensed data of the pattern matrix elements over a predetermined number of said consecutive time sequential frames falls below the threshold value;

segmenting the multidimensional pattern along the time axis to separate the events from one another; and classifying the event data of each separated event into one of said classes with reference to historical reference data relating to anticipated events.

7. A non-transitory computer readable medium hosting a computer program for monitoring over time movement of objects through a monitoring region by recording patterns caused by the movement of the objects, utilizing the patterns to generate a plurality of time sequential events relating to the movement, with each event comprising respective event data and thereafter classifying the event data into a class of a plurality of classes comprising at least a first class of one object moving in a first direction, the computer program, when loaded into a computer, executing the steps of:

receiving from a sensing arrangement data relating to captured consecutive time sequential image frames of at least one object as it moves through the monitoring region which region comprises a plurality of adjacent zones, the plurality of adjacent zones being arranged in the region in two dimensions such that there are at least two adjacent rows of zones extending along a first axis of the monitoring region in the first direction and at least two adjacent rows of zones extending along a second axis of the monitoring region, the consecutive time sequential image frames comprising respective two dimensional pattern matrixes, wherein each pattern matrix comprises a plurality of pattern matrix elements, wherein each pattern matrix element corresponds to a respective one of said zones in the monitoring region and wherein each pattern matrix element of each pattern matrix comprises sensed data relating to the presence or absence at the time of the respective image frame of the at least one object in the corresponding zone;

recording said two dimensional pattern matrixes of said consecutive time sequential image frames and processing the recorded two dimensional pattern matrixes into a multidimensional pattern representing the presence or absence of said at least one object in the zones as it moves through the monitoring region, wherein a first axis of the multidimensional pattern is time and wherein all the pattern matrix elements of each two dimensional pattern matrix of each of said consecutive time sequential image frames are rearranged in a respective single row along a second axis of the multi-dimensional pattern and in time sequential relationship against the time axis, so that the multidimensional pattern comprises a plurality of time sequential events comprising respective event data and wherein an event commences when the sum of the sensed data of the pattern matrix elements over a predetermined number of said consecutive time sequential image frames exceeds a threshold value and terminates when the sum of the sensed data of the pattern matrix elements over a predetermined number of said consecutive time sequential frames falls below the threshold value;

segmenting the multidimensional pattern along the time axis to separate events from one another; and classifying the event data of each separated event into one of said classes with reference to historical reference data relating to anticipated events.

8. Non-transitory firmware hosting a computer program for monitoring movement over time of objects through a monitoring region, by recording patterns caused by the movement of the objects, utilizing the patterns to generate a plurality of time sequential events relating to the movement, with each event comprising respective event data and thereafter classifying the event data into a class of a plurality of classes comprising at least a first class of one object moving in a first direction, the computer program, when loaded into a computer, executing the steps of:

receiving from a sensing arrangement captured consecutive time sequential image receiving from a sensing arrangement data relating to captured consecutive time sequential image frames of at least one object as it moves through the monitoring region which region comprises a plurality of adjacent zones, the plurality of adjacent zones being arranged in the region in two dimensions such that there are at least two adjacent rows of zones extending along a first axis of the monitoring region in the first direction and at least two adjacent rows of zones extending along a second axis of the monitoring region, the consecutive time sequential image frames comprising respective two dimensional pattern matrixes, wherein each pattern matrix comprises a plurality of pattern matrix elements, wherein each pattern matrix element corresponds to a respective one of said zones in the monitoring region and wherein each pattern matrix element of each pattern matrix comprises sensed data relating to the presence or absence at the time of the respective image frame of the at least one object in the corresponding zone;

recording said two dimensional pattern matrixes of said consecutive time sequential image frames and processing the recorded two dimensional pattern matrixes into a multidimensional pattern representing the presence or absence of said at least one object in the zones as it moves through the monitoring region, wherein a first axis of the multidimensional pattern is time and wherein all the pattern matrix elements of each two dimensional pattern matrix of each of said consecutive time sequential image frames are rearranged in a respective single row along a second axis of the multi-dimensional pattern and in time sequential relationship against the time axis, so that the multidimensional pattern comprises a plurality of time sequential events comprising respective event data and wherein an event commences when the sum of the sensed data of the pattern matrix elements over a predetermined number of said consecutive time sequential image frames exceeds a threshold value and terminates when the sum of the sensed data of the pattern matrix elements over a predetermined number of said consecutive time sequential frames falls below the threshold value;

segmenting the multidimensional pattern along the time axis to separate events from one another; and classifying the event data of each separated event into one of said classes with reference to historical reference data relating to anticipated events.

9. A non-transitory computer program for monitoring movement of objects through a monitoring region by recording patterns caused by the movement of the objects, utilizing the patterns to generate a plurality of time sequential events relating to the movement, with each event comprising respective event data and thereafter classifying the event data into a class of a plurality of classes comprising at least a first class of one object moving in a first direction, the computer program, when loaded into a computer, executing the steps of:

receiving from a sensing arrangement data relating to captured consecutive time sequential image frames of at least one object as it moves through the monitoring region which region comprises a plurality of adjacent zones, the plurality of adjacent zones being arranged in the region in two dimensions such that there are at least two adjacent rows of zones extending along a first axis of the monitoring region in the first direction and at least two adjacent rows of zones extending along a second axis of the monitoring region, the consecutive time sequential image frames comprising respective two dimensional pattern matrixes, wherein each pattern matrix comprises a plurality of pattern matrix elements, wherein each pattern matrix element corresponds to a respective one of said zones in the monitoring region and wherein each pattern matrix element of each pattern matrix comprises sensed data relating to the presence or absence at the time of the respective image frame of the at least one object in the corresponding zone;

recording said two dimensional pattern matrixes of said consecutive time sequential image frames and processing the recorded two dimensional pattern matrixes into a multidimensional pattern representing the presence or absence of said at least one object in the zones as it moves through the monitoring region, wherein a first axis of the multidimensional pattern is time and wherein all the pattern matrix elements of each two dimensional pattern matrix of each of said consecutive time sequential image frames are rearranged in a respective single row along a second axis of the multi-dimensional pattern and in time sequential relationship against the time axis, so that the multidimensional pattern comprises a plurality of time sequential events comprising respective event data and wherein an event commences when the sum of the sensed data of the pattern matrix elements over a predetermined number of said consecutive time sequential image frames exceeds a threshold value and terminates when the sum of the sensed data of the pattern matrix elements over a predetermined number of said consecutive time sequential frames falls below the threshold value;

segmenting the multidimensional pattern along the time axis to separate events from one another; and classifying the event data of each separated event into one of said classes with reference to historical reference data relating to anticipated events.

\* \* \* \* \*